(12) United States Patent
Kamimoto (10) Patent No.: US 11,511,219 B2
(45) Date of Patent: Nov. 29, 2022

(54) MANIFOLD WITH MOVABLE CONNECTOLOGY

(71) Applicant: ENTEGRIS, INC., Billerica, MA (US)

(72) Inventor: Satoshi Kamimoto, Yokohama (JP)

(73) Assignee: ENTEGRIS, INC., Billerica, MA (US)

( * ) Notice: Subject to any disclaimer, the term of this patent is extended or adjusted under 35 U.S.C. 154(b) by 56 days.

(21) Appl. No.: 16/886,231

(22) Filed: May 28, 2020

(65) Prior Publication Data

US 2020/0376422 A1 Dec. 3, 2020

Related U.S. Application Data

(60) Provisional application No. 62/853,469, filed on May 28, 2019.

(51) Int. Cl.
*B01D 35/30* (2006.01)
*B01D 27/00* (2006.01)

(52) U.S. Cl.
CPC ............ *B01D 35/306* (2013.01); *B01D 27/00* (2013.01); *B01D 2201/291* (2013.01); *B01D 2201/302* (2013.01); *B01D 2201/304* (2013.01); *B01D 2201/4023* (2013.01)

(58) Field of Classification Search
CPC .................. B01D 35/306; B01D 27/00; B01D 2201/291; B01D 2201/302; B01D 2201/304; B01D 2201/4023; B01D 2201/342; B01D 35/30; B01D 33/23; B01D 33/39; B01D 33/48; B01D 33/82; B01D 2201/29; B01D 2201/30; B01D 27/08; B01D 35/02; F16J 15/062

USPC ....... 210/232, 234–236, 238, 446, 447, 439, 210/435, 459, 463, 282, 455

See application file for complete search history.

(56) References Cited

U.S. PATENT DOCUMENTS

| | | | |
|---|---|---|---|
| 5,387,462 A | 2/1995 | Debe | |
| 6,652,749 B2 | 11/2003 | Stankowski | |
| 7,247,245 B1 | 7/2007 | Proulx | |
| 7,378,017 B2 | 5/2008 | Stankowski | |
| 7,476,315 B2 | 1/2009 | Reid | |
| 9,216,368 B1 | 12/2015 | Williams et al. | |
| 10,221,956 B2 | 3/2019 | Mitchell et al. | |
| 2011/0215043 A1 | 9/2011 | Trottier | |
| 2013/0020246 A1 | 1/2013 | Hoots | |

(Continued)

FOREIGN PATENT DOCUMENTS

| | | |
|---|---|---|
| CN | 101267869 A | 9/2008 |
| JP | H03123689 A | 5/1991 |

(Continued)

*Primary Examiner* — Madeline Gonzalez (57) ABSTRACT

Filter cartridges and manifold blocks for filter manifold systems are described. The filter cartridges include flanges surrounding openings at first and second ends of the filter cartridge, with face seals in the flanges. Manifold blocks include end blocks, at least one of which is movable so that the distance between the end blocks can be changed. When a filter cartridge is installed into the manifold by engagement of the flanges with slots in the manifold end blocks, a fluid pathway is formed through a first manifold end block, into the filter cartridge, through the filter cartridge, out of the filter cartridge and into a second manifold end block. The fluid pathway is sealed by the face seals where the flow is from a manifold end block into or out of the filter cartridge.

19 Claims, 4 Drawing Sheets

(56) References Cited

U.S. PATENT DOCUMENTS

| | | | |
|---|---|---|---|
| 2013/0062266 A1 | 3/2013 | Horner | |
| 2013/0228509 A1* | 9/2013 | Kuruc | B01D 35/30 |
| | | | 210/435 |
| 2018/0140974 A1 | 5/2018 | Uchida | |
| 2018/0140980 A1* | 5/2018 | Uchida | B01D 35/30 |

FOREIGN PATENT DOCUMENTS

| | | |
|---|---|---|
| TW | 541057 B | 7/2016 |
| TW | 599392 B | 9/2017 |
| TW | 613001 B | 2/2018 |
| WO | 2005110575 A1 | 11/2005 |

* cited by examiner

MANIFOLD WITH MOVABLE CONNECTOLOGY

CROSS-REFERENCE TO RELATED APPLICATIONS

This application claims the benefit under 35 USC 119 of U.S. Provisional Patent Application No. 62/853,469, filed May 28, 2019, the disclosure of which is hereby incorporated herein by reference in its entirety for all purposes.

FIELD

This disclosure is directed to a manifold and a filter cartridge for use with the manifold, particularly a filter cartridge using flanges to connect to the manifold at each end and a manifold where at least one connector is movable.

BACKGROUND

Manifolds may be used to hold replaceable filter cartridges used for filtering fluids, for example during manufacturing processes such as semiconductor manufacture. The manifolds may direct the fluid into the manifold and receive the filtered fluid as it flows out of the manifold.

Filter cartridges may expand under pressure. To accommodate this expansion, the manifolds may include one connector which allows movement of the filter cartridge connector. This also places stress on the body of the manifold and the pressurized cartridge presses against the manifold.

SUMMARY

This disclosure is directed to a manifold and a filter cartridge for use with the manifold, particularly a filter cartridge using flanges to connect to the manifold at each end and a manifold where at least one connector is movable.

Connection using a flange and a face seal provides a more secure connection and more effective sealing than a ball joint or straight portion, but using one at both ends of a filter cartridge would cause fixed manifold blocks to be subject to undue stress and warpage from expansion, or risk poor fitting when different cartridges are used. Allowing at least one end of a filter block to be slidable in the length direction of the filter cartridge allows the manifold block to accept filter cartridge expansion or variance in the length of the filter cartridge. In turn, filter cartridges for use with this manifold can use flanges and face seals at both ends, improving the security of the connection and the quality of sealing.

Further, using face seals as opposed to seals along a perimeter of a projection prevents the seals from being displaced from their groove by friction as the filter cartridge expands and contracts, removing a possible point of failure for the filter and manifold.

In an embodiment, a filter unit includes a filter body, a first end of the filter body having a first aperture, a first flange located at the first end. The filter unit also has a second end of the filter body, opposite the first end and having a second aperture and a second flange, located at the second end. The filter unit has a first length from the first end of the filter body to the second end of the filter body when inserted into a manifold and the filter unit is unpressurized and a second length from the first end of the filter body to the second end of the filter body, greater than the first length, when the filter unit is inserted into the manifold and the filter unit is pressurized.

In an embodiment, the filter unit further includes a first seal at the first end and a second seal at the second end. In an embodiment, the first seal and the second seal are each face seals. In an embodiment, the first seal is located in a first groove formed in the first flange and the second seal is located in a second groove formed in the second flange. In an embodiment, the first groove is formed on a face of the first flange opposite the filter body, and the second groove is formed on a face of the second flange opposite the filter body.

In an embodiment, the filter body includes a slurry filter.

In an embodiment, a filter manifold system includes a filter unit and a manifold block. The filter unit includes a filter body, a first end of the filter body having a first aperture, a first flange located at the first end. The filter unit also has a second end of the filter body, opposite the first and having a second aperture and a second flange, located at the second end. The manifold block includes a first end block including a first block aperture and a first slot configured to receive the first flange of the filter unit, second end block having a second block aperture and a second slot configured to receive the second flange of the filter unit, and a manifold block body. At least one of the first end block and the second end block are configured to be movable along the manifold block body such that a distance from the first end block to the second end block is changeable.

In an embodiment, the filter unit further includes a first seal at the first end and a second seal at the second end, and wherein the first seal and the second seal are each face seals. In an embodiment, the first seal is located in a first groove formed in the first flange and the second seal is located in a second groove formed in the second flange.

In an embodiment, the filter unit is configured such that a distance from the first end to the second end changes when the filter unit is pressurized.

In an embodiment, when the filter unit is installed into the manifold block and pressurized, the distance from the first end block to the second end block is changed.

In an embodiment, the filter manifold system is configured such that when the first flange is received by the first slot and the second flange is received by the second slot, a fluid pathway is formed by the first block aperture, the first filter aperture, the filter body, the second filter aperture, and the second block aperture.

In an embodiment, the first end block includes a connector for a first fluid line in communication with the first block aperture and the second end block includes a connector for a second fluid line in communication with the second block aperture.

In an embodiment, the manifold block body includes a manifold block body slot, and the at least one of the first end block and the second end block that are configured to be movable include an end block flange configured to fit within the manifold block body slot.

In an embodiment, at least one of the first end block and the second end block is fixed to the manifold block body.

In an embodiment, a manifold block includes a first end block including a first block aperture and a first slot configured to receive a first flange, a second end block having a second block aperture and a second slot configured to receive the second flange, and a manifold block body. At least one of the first end block and the second end block are configured to be movable along the manifold block body such that a distance from the first end block to the second end block is changeable.

In an embodiment, first end block includes a connector for a first fluid line in communication with the first block aperture and the second end block includes a connector for a second fluid line in communication with the second block aperture.

In an embodiment, the manifold block body includes at least one manifold block body slot, and the at least one of the first end block and the second end block that are configured to be movable include an end block flange configured to fit within one of the at least one manifold block body slots.

In an embodiment, at least one of the first end block and the second end block is fixed to the manifold block body.

DETAILED DESCRIPTION

This disclosure is directed to a manifold and a filter cartridge for use with the manifold, particularly a filter cartridge using flanges to connect to the manifold at each end and a manifold where at least one connector is movable.

Figure 1:
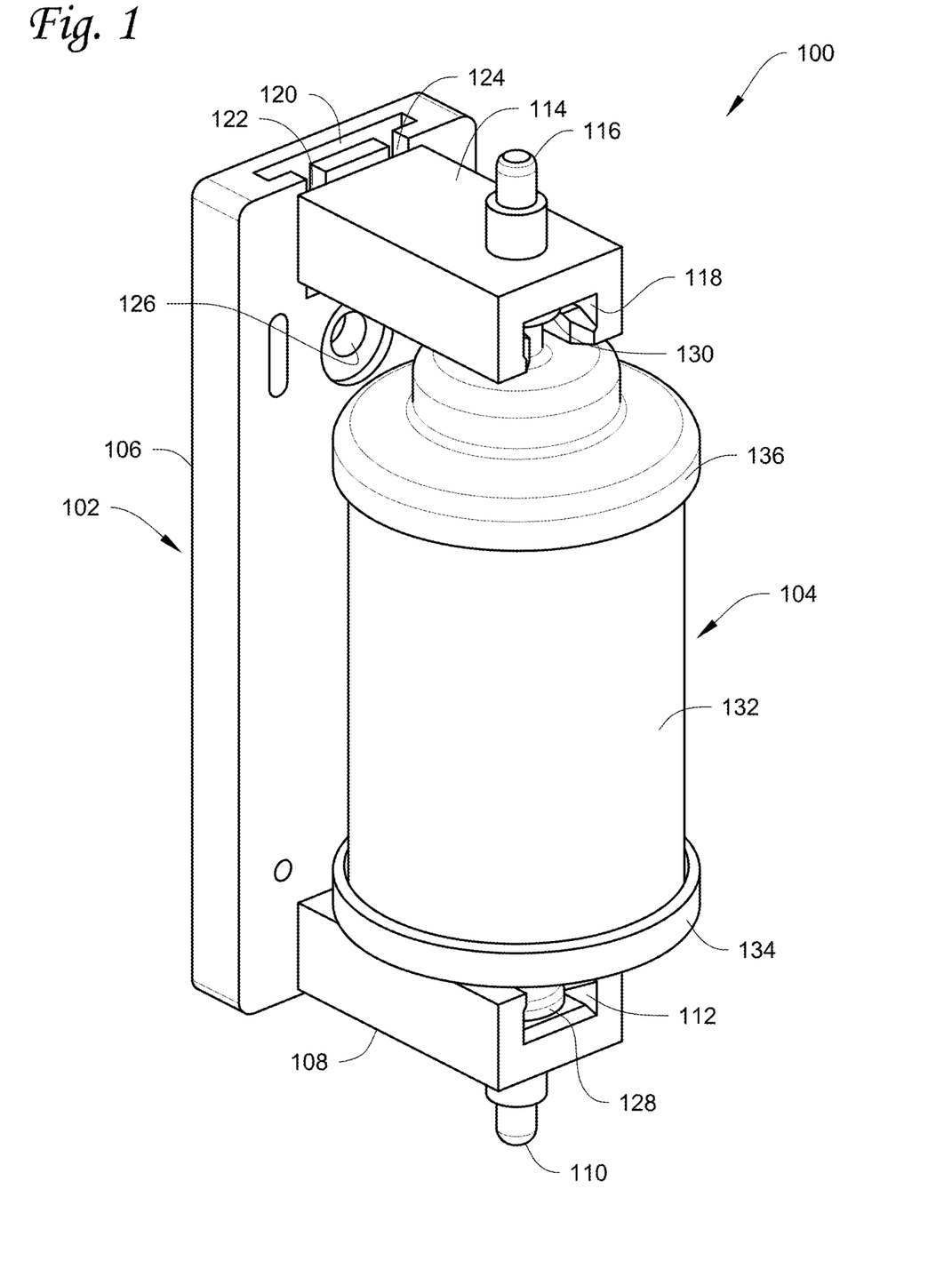
FIG. 1 shows a perspective view of a manifold and filter cartridge according to an embodiment.

FIG. 1 shows a perspective view of a manifold and filter cartridge system 100 according to an embodiment. Manifold and filter cartridge system 100 includes manifold block 102 and filter cartridge 104.

Manifold block 102 includes manifold block body 106, and first end block 108 and second end block 114 mounted on manifold block body 106. First end block 108 includes a first fluid flow connector 110 and first slot 112. In an embodiment, first end block 108 may be fixed to manifold block body 106. Second end block 114 includes a second fluid flow connector 116 and second slot 118. Manifold block body 106 may further include an aperture 126, for example to allow a connector to join the manifold block body 106 to a surface.

First fluid flow connector 110 provides a connection point for a fluid line. The fluid line may be, for example, a tube conveying fluid to or from the manifold and filter cartridge system 100. The first fluid flow connector 110 includes an aperture allowing fluid to flow from one end of first fluid flow connector 110 to the opposite end. The first fluid flow connector 110 may include features to allow the connection of a fluid line, such as engagement features allowing mechanical connection of the fluid line.

First slot 112 is a slot formed in first end block 108. First slot 112 is configured to receive a first flange 128 on the filter cartridge 104. First slot 112 may be ramped at and/or near the surface of first end block 108, for example to facilitate insertion of the first flange 128 of filter cartridge 104. First slot 112 may have a depth such that when first flange 128 is fully inserted into first slot 112, a fluid inlet or outlet aperture (not shown) of filter cartridge 104 is aligned with first fluid flow connector 110.

Second fluid flow connector 116 provides a second connection point for a fluid line, for example, a hose conveying fluid to or from the manifold and filter cartridge system 100. The second fluid flow connector 116 includes an aperture allowing fluid to flow from one end of second fluid flow connector 116 to the opposite end. The second fluid flow connector 116 may include features to allow the connection of a fluid line, such as engagement features allowing mechanical connection of the fluid line.

Second slot 118 is a slot formed in second end block 114. Second slot 118 is configured to receive a second flange 130 on the filter cartridge 104. Second slot 118 may be ramped at and/or near the surface of second end block 114, for example to facilitate insertion of the second flange 130 of filter cartridge 104. Second slot 118 may have a depth such that when second flange 130 is fully inserted into second slot 118, a fluid inlet or outlet aperture (not shown) of filter cartridge 104 is aligned with second fluid flow connector 116.

Second end block 114 includes a tab (not shown). The tab may be inserted into manifold block body slot 120, formed at an end of manifold block body 106. The tab and manifold block body slot 120 are sized such that the tab fits within manifold block body slot 120 such that the tab is slidable within manifold block body slot 120. Thus, second end block 114 may be slidable along manifold block body 106, such that a distance from the first end block 108 to the second end block 114 may be varied. Manifold block body 106 may further include slits 122 and 124 to allow the part of second block end unit 114 outside of manifold block body 106 to be joined with the tab. In an embodiment, the first end block 108 may also include a tab and manifold block body 106 may include a second slot configured to accommodate the tab of the first end block 108. In an embodiment, both end blocks 108, 114 may be slidable such that the distance between them can be changed.

Filter cartridge 104 includes first flange 128, second flange 130, filter cartridge body 132, first end 134, and second end 136.

Filter cartridge body 132 is the body of the filter cartridge 104, providing an exterior surface of the filter cartridge 104. Filter cartridge 104 may contain filter media to filter a fluid. In an embodiment, the filter media is a melt blown polypropylene material. In an embodiment, the fluid is a slurry. In an embodiment, the fluid is a fluid used in semiconductor manufacture. In an embodiment, the fluid is a slurry.

Filter cartridge body 132 includes a first end 134. The first end may include a first flange 128, configured to interface with a first slot 112 in a first end block 108 of a manifold block 102.

Filter cartridge body 132 also includes a second end 136, opposite first end 134. Second end 136 may include second flange 130, configured to interface with second slot 118 in second end block 114 of manifold block 102. Both first end 134 and second end 136 may include flanges 128, 130 to secure the filter cartridge 104 within manifold block 102

When the filter cartridge is pressurized, for example by flow of the fluid being filtered through the filter cartridge, first end 134 and second end 136 may be pushed away from one another by the pressure within the filter cartridge body 132, extending the length of the filter cartridge 104 in the direction from first end 134 to second end 136. This expansion may be allowed by movement of second end block 114 via travel of the tab within slot 120.

Figure 2:
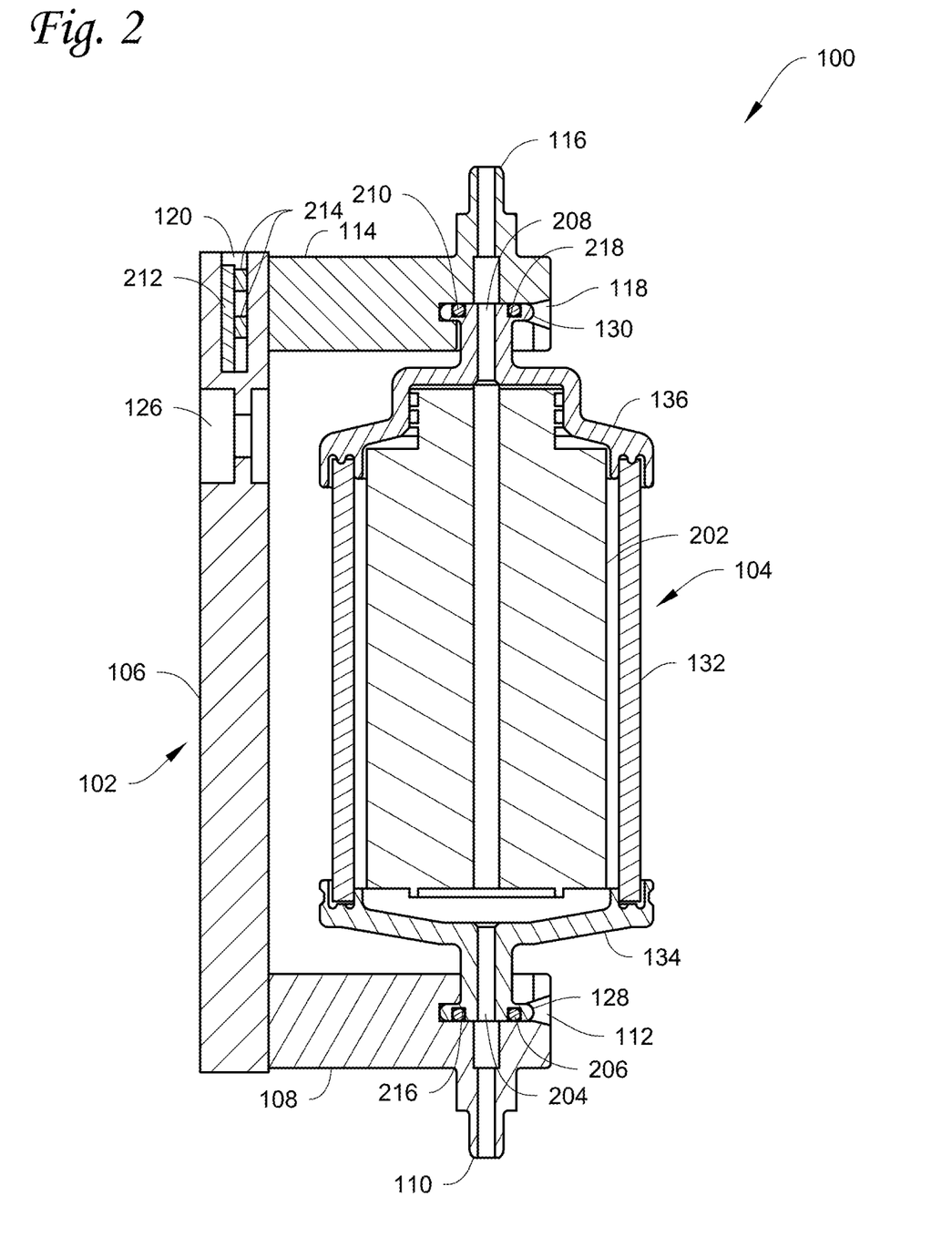
FIG. 2 shows a sectional view of a manifold and filter cartridge according to the embodiment shown in FIG. 1.

FIG. 2 shows a sectional view of the manifold and filter cartridge system 100 according to the embodiment shown in FIG. 1.

As can be seen in the sectional view of FIG. 2, filter cartridge 104 contains filter media 202. In an embodiment, the filter media is a melt blow polypropylene material. The filter media may be used to filter a fluid. Non-limiting examples of the fluid include a slurry, such as a slurry used in semiconductor manufacture.

First end 134 of filter cartridge 104 includes first flange 128. As can be seen in the sectional view of FIG. 2, first flange 128 includes first aperture 204. First aperture 204 is configured to allow fluid to flow into or out of filter cartridge 104, for example to and through the filter media 202. When first flange 128 is fully inserted into first slot 112, the first aperture 204 may be aligned with the fluid flow path of first fluid flow connector 110 to form a flow path into or out of the filter cartridge 104. First seal 206 is located on a face of first flange 128. First seal 206 surrounds first aperture 204. First seal 206 forms a seal preventing leakage from exiting or contamination from entering the flow path from first fluid flow connector 110 into filter cartridge 104 via first aperture 204. In an embodiment, first seal 206 may form a face seal with first end block 108 on the surface of first slot 112 when first flange 128 is fully inserted into first slot 112. First seal 206 may be disposed in first groove 216 that is formed in the face of first flange 128 having first aperture 204.

Second end 136 of filter cartridge 104 includes second flange 130. As can be seen in the sectional view of FIG. 2, second flange 130 includes second aperture 208. Second aperture 208 is configured to allow fluid to flow into or out of filter cartridge 104, for example to and through the filter media 202. When second flange 130 is fully inserted into second slot 118, second aperture 208 may be aligned with the fluid flow path of second fluid flow connector 116 to form a flow path into or out of filter cartridge 104. Second seal 210 is located on a face of second flange 130. Second seal 210 surrounds second aperture 208. Second seal 210 forms a seal preventing leakage from exiting or contamination from entering the flow path from second fluid flow connector 116 into filter cartridge 104 via second aperture 208. In an embodiment, second seal 210 may form a face seal with second end block 114 on the surface of second slot 118 when second flange 130 is fully inserted into second slot 118. Second seal 210 may be disposed in second groove 218 that is formed in the face of second flange 130 having second aperture 208.

Each of first and second seals 206, 210 may be, as non-limiting examples, o-rings, flat gaskets, or other such seals. First and second seals 206, 210 may be polymer seals. In an embodiment, first and second seals 206, 210 may be fluoropolymer seals. In an embodiment, first and second seals 206, 210 may be elastomeric seals. Materials for the first and second seals 206, 210 may be selected based on design aspects including outgassing, particle generation, volatility, and the like, based on the application and the fluid being passed through the manifold and filter cartridge system 100.

As can be seen in the sectional view of manifold block 102, aperture 126 can be seen extending through the manifold block body 106, for example to allow mounting of manifold block 102.

As can be seen in the sectional view of FIG. 2, slot 120 extends into the manifold block body 106. Second end block 114 includes tab 212, which is disposed within slot 120. Second end block 114 may be joined to tab 212 by one or more beams 214. With reference to FIG. 1, the one or more beams may extend through slits 122, 124 to join the second end block to tab 212 to allow the second end block to be moved with respect to first end block 108 while second end block 114 is retained by the position of tab 212 within slot 120.

Figure 3:
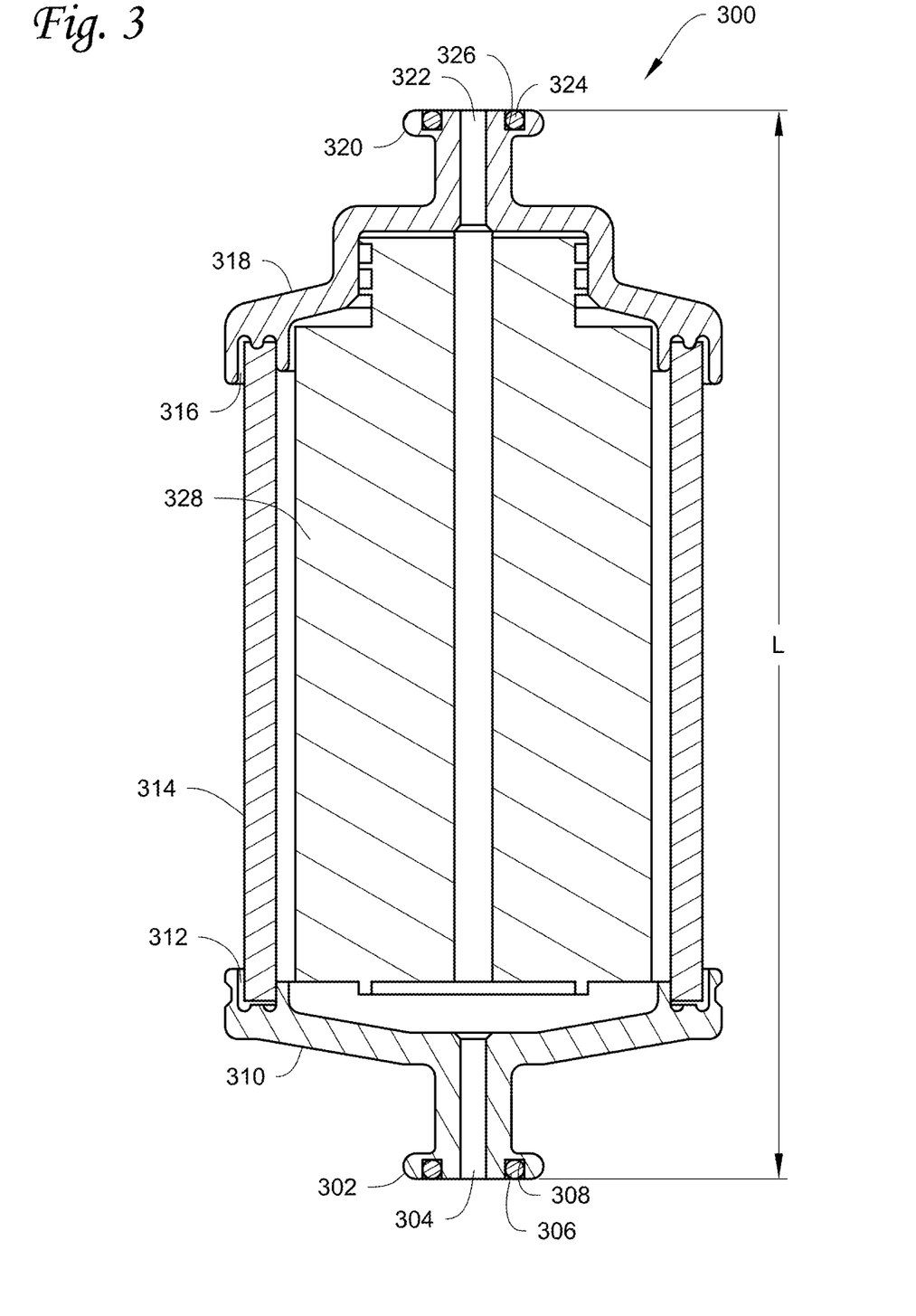
FIG. 3 shows a sectional view of a filter cartridge according to an embodiment.

FIG. 3 shows a sectional view of a filter cartridge 300 according to an embodiment. Filter cartridge 300 includes first flange 302 as part of first end piece 310. The first flange includes first aperture 304. First seal 306 surrounds the first aperture. In an embodiment, the first seal is disposed in first seal groove 308 formed in first flange 302 on the same face as first aperture 304. First seal 306 may be, as non-limiting examples, an o-ring, flat gasket, or another such seal. The first seal may be a polymer seal, for example a fluoropolymer and/or an elastomeric seal. The material of first seal 306 may be selected based on design aspects including outgassing, particle generation, volatility, and the like, based on the application and the fluid being passed through the filter cartridge 300.

First aperture 304 may provide a fluid flow path allowing a fluid introduced at first aperture 304 to pass to filter media 328, or from the filter media to the first aperture. Filter media 328 may be contained within a body defined by filter cartridge body 314. In an embodiment, filter cartridge body 314 may be generally cylindrical in shape.

First end piece 310 may be located at one end of filter cartridge body 314. In an embodiment, first end piece 310 may include first recess 312 configured to accommodate a portion of filter cartridge body 314. Filter cartridge body 314 may be movable with respect to first end piece 310, such that the filter cartridge 300 may expand in a lengthwise direction (defined by length L shown in FIG. 3).

Filter cartridge 300 includes second flange 320 as part of second end piece 318. The second flange includes second aperture 322. Second seal 324 surrounds the second aperture. In an embodiment, the second seal is disposed in second seal groove 326 formed in second flange 320 on the same face as second aperture 322. Second seal 324 may be, as non-limiting examples, an o-ring, flat gasket, or another such seal. The second seal may be a polymer seal, for example a fluoropolymer and/or an elastomeric seal. The material of second seal 324 may be selected based on design aspects including outgassing, particle generation, volatility, and the like, based on the application and the fluid being passed through the filter cartridge 300. Second seal 324 may have the same shape and/or use the same materials as first seal 306. In an embodiment, second seal 324 may have a different shape and/or use different materials from first seal 306.

Second aperture 322 may provide a fluid flow path allowing a fluid introduced at second aperture 322 to pass to filter media 328, or from the filter media to the second aperture.

Second end piece 318 may be located at an end of filter cartridge body 314 opposite the end at which first end piece 310 is located. In an embodiment, second end piece 318 may include a second recess 316 configured to accommodate a portion of filter cartridge body 314. Filter cartridge body 314 may be movable with respect to second end piece 318 such that the filter cartridge may expand in a lengthwise direction (defined by length L shown in FIG. 3).

Filter cartridge 300 has a length L from first flange 302 to second flange 320. Length L may be a first value when the filter cartridge is not in use, and a second length L' (not shown) when the filter cartridge has been inserted into a filter manifold and fluid entering the filter cartridge by one of first or second apertures 304, 322 pressurizes the filter cartridge. The second length L' when filter cartridge 300 is pressurized is larger than the first length L.

Figure 4:
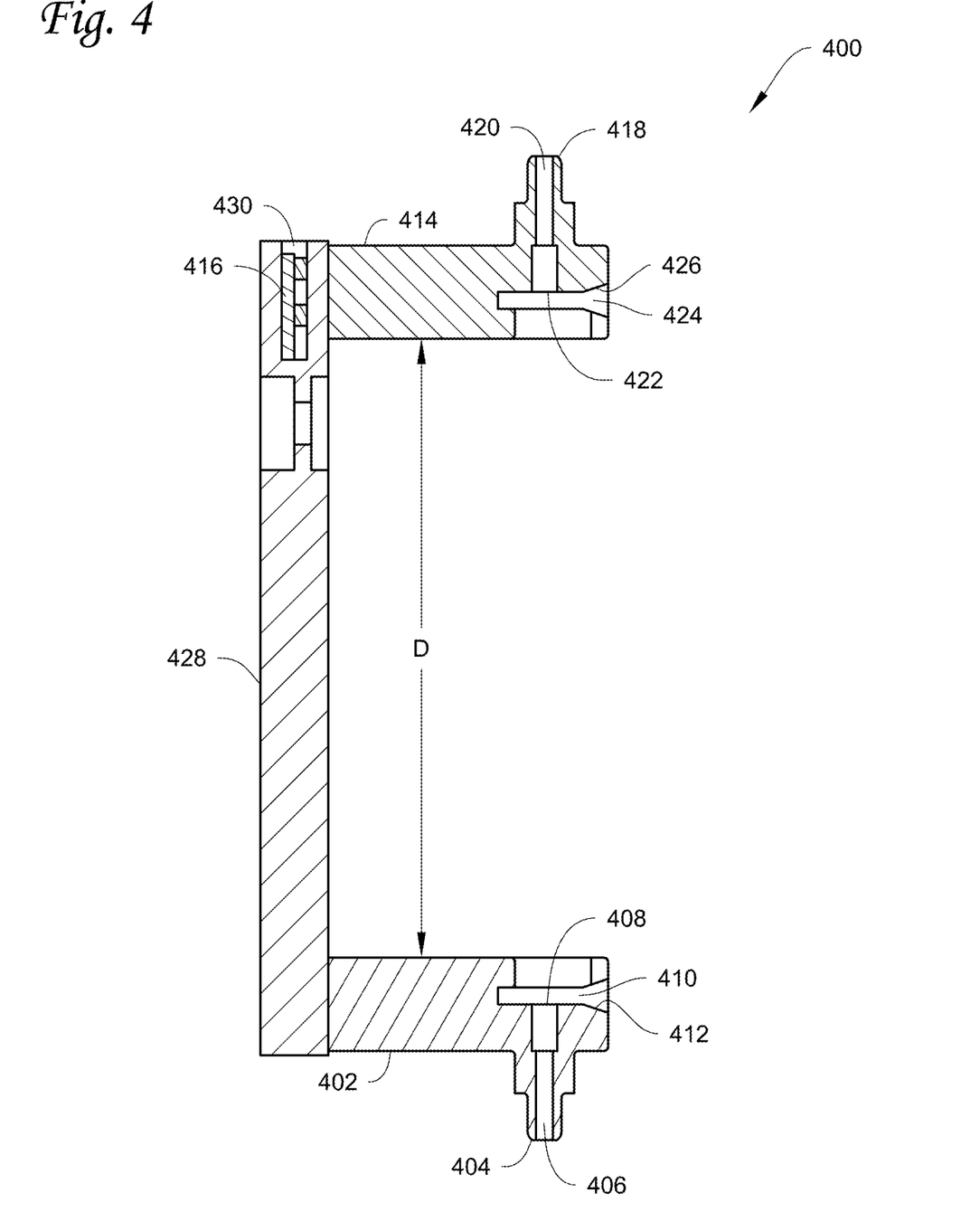
FIG. 4 shows a sectional view of a manifold block according to an embodiment.

FIG. 4 shows a sectional view of a manifold block 400 according to an embodiment. Manifold block 400 includes first end block 402, second end block 414, and manifold block body 428.

First end block 402 includes first fluid connection point 404. First fluid flow path 406 extends from first fluid connection point to first fluid filter cartridge interface 408. First fluid filter cartridge interface 408 may be an aperture positioned to correspond to an aperture of a filter cartridge when the filter cartridge is fully inserted into first slot 410 of first end block 402. Fluid may flow through the aperture at first fluid filter cartridge interface 408 to pass to or from first fluid flow path 406 to the filter cartridge when it is installed in manifold block 400.

First end block 402 also includes first slot 410. First slot 410 is configured to receive a flange, such as first flange 302 of filter cartridge 300 shown in FIG. 3 and detailed above. First slot 410 may include first ramped surfaces 412 at the opening of the first slot at an end of first end block 402. The first ramped surfaces 412 may, for example, facilitate insertion of a flange into the first slot 410. The first ramped surfaces may converge to a final height of the first slot. The final height of the first slot may correspond to the thickness of a flange to be inserted into first slot, such as first flange 302 of filter cartridge 300 shown in FIG. 3 and detailed above.

Second end block 414 includes a second fluid connection point 418. Second fluid flow path 420 extends from second fluid connection point 418 to second fluid filter cartridge interface 422. Second fluid filter cartridge interface 422 may be an aperture positioned to correspond to an aperture of a filter cartridge when the filter cartridge is fully inserted into second slot 424 of second end block 414. Fluid may flow through the aperture at second fluid filter cartridge interface 422 to pass to or from second fluid flow path 420 to the filter cartridge when it is installed in manifold block 400.

Second end block 414 also includes second slot 424. Second slot 424 is configured to receive a flange, such as second flange 320 of filter cartridge 300 shown in FIG. 3 and detailed above. Second slot 424 may include second ramped surfaces 426 at the opening of the second slot at an end of second end block 414. The second ramped surfaces may, for example, facilitate insertion of a flange into the second slot. The second ramped surfaces 426 may converge to a final height of second slot 424. The final height of the second slot may correspond to the thickness of a flange to be inserted into second slot 424, such as second flange 320 of filter cartridge 300 shown in FIG. 3 and detailed above. In an embodiment, the final height of first slot 410 and the final height of second slot 424 are the same. In an embodiment, the final height of the first slot and the final height of the second slot are different from one another.

In an embodiment such as that shown in FIG. 4, first end block 402 may be fixed to manifold block body 428 while second end block 414 is movable along manifold block body 428. In this embodiment, second end block 414 is connected to via tab 416, which is within manifold block slot 430 formed in the manifold block body. The tab may be slidable within manifold block slot 430. In an embodiment, both first and second end blocks 402, 414 may be movable along manifold block body 428 with respect to one another, for example, by each of first and second end blocks 402, 414 being connected via tabs such as tab 416 disposed in slots such as manifold block slot 430.

The distance D between first end block 402 and second end block 414 may have a resting value when no filter cartridge is inserted into manifold block 400. For example, when no filter cartridge is inserted into manifold block 400, tab 416 may rest at a fixed position such as a bottom of slot 430 due to gravity or another source of retaining force such as, as non-limiting examples, an elastic retainer, a spring, or the like. In an embodiment, when a filter cartridge is inserted into manifold block 400, the distance D may be changed based on a minimum length of the filter cartridge from its first flange to its second flange. In an embodiment, the distance D may further change as the filter cartridge is used, for example via introduction of fluid into the filter cartridge and its resulting pressurization via one of first or second fluid connection points 404, 418. The distance D may further vary continuously over operation of manifold block 400 and the installed filter cartridge as pressure changes in the filter cartridge, for example due to changes in fluid flow rates over the course of the application in which the manifold block 400 and filter cartridge are being used.

Aspects:

It is understood that any of aspects 1-6 can be combined with any of aspects 7-15 and/or any of aspects 16-19. It is understood that any of aspects 7-15 may be combined with any of aspects 16-19.

Aspect 1. A filter unit, comprising:
a filter body;
a first end of the filter body having a first aperture;
a first flange, located at the first end;
a second end of the filter body, opposite the first end and having a second aperture; and
a second flange, located at the second end;
wherein the filter unit has a first length from the first end of the filter body to the second end of the filter body when inserted into a manifold and the filter unit is unpressurized and a second length from the first end of the filter body to the second end of the filter body, greater than the first length, when the filter unit is inserted into the manifold and the filter unit is pressurized.

Aspect 2. The filter unit according to aspect 1, further comprising a first seal at the first end and a second seal at the second end.

Aspect 3. The filter unit according to aspect 2, wherein the first seal and the second seal are each face seals.

Aspect 4. The filter unit according to any of aspects 2-3, wherein the first seal is located in a first groove formed in the first flange and the second seal is located in a second groove formed in the second flange.

Aspect 5. The filter unit according to aspect 4, wherein the first groove is formed on a face of the first flange opposite the filter body, and the second groove is formed on a face of the second flange opposite the filter body.

Aspect 6. The filter unit according to any of aspects 1-5, wherein the filter body includes a slurry filter.

Aspect 7. A filter manifold system, comprising:
a filter unit, the filter unit including:
  a filter body;
  a first end having a first filter aperture;
  a first flange, located at the first end;
  a second end, opposite the first end and having a second filter aperture; and
  a second flange, located at the second end;
a manifold block, the manifold block including:
  a first end block including a first block aperture and a first slot configured to receive the first flange of the filter unit;
  a second end block having a second block aperture and a second slot configured to receive the second flange of the filter unit; and
  a manifold block body, wherein at least one of the first end block and the second end block are configured to be movable along the manifold block body such that a distance from the first end block to the second end block is changeable.

Aspect 8. The filter manifold system according to aspect 7, wherein the filter unit further comprises a first seal at the first end and a second seal at the second end, and wherein the first seal and the second seal are each face seals.

Aspect 9. The filter manifold system according to aspect 8, wherein the first seal is located in a first groove formed in the first flange and the second seal is located in a second groove formed in the second flange.

Aspect 10. The filter manifold system according to any of aspects 7-9, wherein the filter unit is configured such that a distance from the first end to the second end changes when the filter unit is pressurized.

Aspect 11. The filter manifold system according to aspect 10, wherein when the filter unit is installed into the manifold block and pressurized, the distance from the first end block to the second end block is changed.

Aspect 12. The filter manifold system according to any of aspects 7-11, configured such that when the first flange is received by the first slot and the second flange is received by the second slot, a fluid pathway is formed by the first block aperture, the first filter aperture, the filter body, the second filter aperture, and the second block aperture.

Aspect 13. The filter manifold system according to any of aspects 7-12, wherein the first end block includes a connector for a first fluid line in communication with the first block aperture and the second end block includes a connector for a second fluid line in communication with the second block aperture.

Aspect 14. The filter manifold system according to any of aspects 7-13, wherein the manifold block body includes a manifold block body slot, and the at least one of the first end block and the second end block that are configured to be movable include an end block flange configured to fit within the manifold block body slot.

Aspect 15. The filter manifold system according to any of aspects 7-14, wherein at least one of the first end block and the second end block is fixed to the manifold block body.

Aspect 16. A manifold block, comprising:
a first end block including a first block aperture and a first slot configured to receive a first flange;
a second end block having a second block aperture and a second slot configured to receive the second flange; and
a manifold block body,
wherein at least one of the first end block and the second end block are configured to be movable along the manifold block body such that a distance from the first end block to the second end block is changeable.

Aspect 17. The manifold block according to aspect 16, wherein the first end block includes a connector for a first fluid line in communication with the first block aperture and the second end block includes a connector for a second fluid line in communication with the second block aperture.

Aspect 18. The manifold block according to any of aspects 16-17, wherein the manifold block body includes at least one manifold block body slot, and the at least one of the first end block and the second end block that are configured to be movable include an end block flange configured to fit within one of the at least one manifold block body slots.

Aspect 19. The manifold block according to any of aspects 16-18, wherein at least one of the first end block and the second end block is fixed to the manifold block body.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A filter unit, comprising:
a filter body;
a first end of the filter body having a first aperture;
a first flange, located at the first end;
a second end of the filter body, opposite the first end and having a second aperture; and
a second flange, located at the second end;
wherein the filter unit has a first length from the first end of the filter body to the second end of the filter body when inserted into a manifold block comprising a first end block configured to receive the first flange, a second end block configured to receive the second flange, and a manifold block body and the filter unit is unpressurized,
wherein the filter unit has a second length from the first end of the filter body to the second end of the filter body, greater than the first length, when the filter unit is inserted into the manifold block and the filter unit is pressurized, and
wherein at least one of the first end block and the second end block are configured to be movable along the manifold block body such that a distance from the first end block to the second end block is changeable.

2. The filter unit of claim 1, further comprising a first seal at the first end and a second seal at the second end.

3. The filter unit of claim 2, wherein the first seal and the second seal are each face seals.

4. The filter unit of claim 2, wherein the first seal is located in a first groove formed in the first flange and the second seal is located in a second groove formed in the second flange.

5. The filter unit of claim 4, wherein the first groove is formed on a face of the first flange opposite the filter body, and the second groove is formed on a face of the second flange opposite the filter body.

6. The filter unit of claim 1, wherein the filter body includes a slurry filter.

7. A filter manifold system, comprising:
a filter unit, the filter unit including:
a filter body;
a first end having a first filter aperture;
a first flange, located at the first end;
a second end, opposite the first end and having a second filter aperture; and
a second flange, located at the second end;
a manifold block, the manifold block including:
a first end block including a first block aperture and a first slot configured to receive the first flange of the filter unit;
a second end block having a second block aperture and a second slot configured to receive the second flange of the filter unit; and
a manifold block body,
wherein at least one of the first end block and the second end block are configured to be movable along the manifold block body such that a distance from the first end block to the second end block is changeable.

8. The filter manifold system of claim 7, wherein the filter unit further comprises a first seal at the first end and a second seal at the second end, and wherein the first seal and the second seal are each face seals.

9. The filter manifold system of claim 8, wherein the first seal is located in a first groove formed in the first flange and the second seal is located in a second groove formed in the second flange.

10. The filter manifold system of claim 7, wherein the filter unit is configured such that, when a distance from the first end to the second end changes when the filter unit is pressurized, at least one of the first end block and the second end block moves.

11. The filter manifold system of claim 10, wherein when the filter unit is installed into the manifold block and pressurized, the distance from the first end block to the second end block is changed.

12. The filter manifold system of claim 7 configured such that when the first flange is received by the first slot and the second flange is received by the second slot, a fluid pathway is formed by the first block aperture, the first filter aperture, the filter body, the second filter aperture, and the second block aperture.

13. The filter manifold system of claim 7, wherein the first end block includes a connector for a first fluid line in communication with the first block aperture and the second end block includes a connector for a second fluid line in communication with the second block aperture.

14. The filter manifold system of claim 7, wherein the manifold block body includes a manifold block body slot, and the at least one of the first end block and the second end block that are configured to be movable include an end block flange configured to fit within the manifold block body slot.

15. The filter manifold system of claim 7, wherein at least one of the first end block and the second end block is fixed to the manifold block body.

16. A manifold block, comprising:
a first end block including a first block aperture and a first slot configured to receive a first flange located at a first end of a filter body of a filter unit;
a second end block having a second block aperture and a second slot configured to receive a second flange located at a second end of the filter body of the filter unit; and
a manifold block body,
wherein at least one of the first end block and the second end block are configured to be movable along the manifold block body such that a distance from the first end block to the second end block is changeable.

17. The manifold block of claim 16, wherein the first end block includes a connector for a first fluid line in communication with the first block aperture and the second end block includes a connector for a second fluid line in communication with the second block aperture.

18. The manifold block of claim 16, wherein the manifold block body includes at least one manifold block body slot, and the at least one of the first end block and the second end block that are configured to be movable include an end block flange configured to fit within at least one of the manifold block body slots.

19. The manifold block of claim 16, wherein at least one of the first end block and the second end block is fixed to the manifold block body.

* * * * *